United States Patent
Burnett

(10) Patent No.: US 7,080,406 B2
(45) Date of Patent: Jul. 18, 2006

(54) METHOD FOR TRANSFERRING PRIVILEGE ACCESS TO A RESOURCE MANAGER WITH SUBSEQUENT LOSS OF PRIVILEGE BY THE INITIATING IDENTITY

(75) Inventor: Rodney Carl Burnett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 09/738,367

(22) Filed: Dec. 15, 2000

(65) Prior Publication Data
US 2002/0078378 A1    Jun. 20, 2002

(51) Int. Cl.
G06F 7/04    (2006.01)

(52) U.S. Cl. .................... 726/18; 709/223; 709/229; 707/9; 718/100; 72/31; 72/33

(58) Field of Classification Search ........ 713/200–202; 709/229, 223; 707/9; 718/100; 726/31, 726/33, 18
See application file for complete search history.

(56) References Cited

U.S. PATENT DOCUMENTS

| 5,146,575 | A | * | 9/1992 | Nolan, Jr. ................. 711/164 |
| 5,295,266 | A | * | 3/1994 | Hinsley et al. ............ 718/101 |
| 5,361,359 | A | * | 11/1994 | Tajalli et al. .............. 726/23 |
| 5,473,692 | A | * | 12/1995 | Davis ........................ 705/59 |
| 5,539,906 | A | * | 7/1996 | Abraham et al. ........... 707/9 |
| 5,790,664 | A | * | 8/1998 | Coley et al. .............. 709/203 |
| 5,940,589 | A | * | 8/1999 | Donovan et al. .......... 713/200 |
| 2001/0047485 | A1 | * | 11/2001 | Brown et al. .............. 713/201 |

OTHER PUBLICATIONS

Matt Bishop, Unix Security in a Supercomputing Environment, Aug. 1989, ACM Press, 693-98.*
Frink, Alexander, "CHOWN: change file owner for Windows NT, version 1.1, Oct. 1998," Oct. 1998, pp. 1-6.*

* cited by examiner

Primary Examiner—Matthew Smithers
Assistant Examiner—Michael Pyzocha
(74) Attorney, Agent, or Firm—Jeffrey LaBaw; Darcell Walker

(57) ABSTRACT

The present invention describes a privilege transfer method between programs in a computing system. This transfer method allows a resource manager such as a security manager to be initially started on the system by the system's native privileged user. This user has the needed native privilege to add it to the system. Subsequently the privilege to administer the security manager is transferred from the native privileged identity to a designated user identity. Once transferred, the initial privileged identity, the system's native privileged user, losses privilege with respect to the security manager and the new registered identity gains administrative control over the security manager. Since the new registered identity is not the native root identity, the security of the native system is not compromised.

11 Claims, 6 Drawing Sheets

METHOD FOR TRANSFERRING PRIVILEGE ACCESS TO A RESOURCE MANAGER WITH SUBSEQUENT LOSS OF PRIVILEGE BY THE INITIATING IDENTITY

FIELD OF THE INVENTION

The present invention describes a method for controlling the access to a resource manager and in particular to a method for transferring privilege access of a resource manager from an initiating program identity to a resource manager administrator identity.

BACKGROUND OF THE INVENTION

Many computer operating systems support a principal identity. This identity is highly privileged and may perform any operation on the local computer system. For example, an administrator program in the UNIX operating system, called 'Root' has a high privilege. This program can perform all administrative functions and may bypass any local computer system security. In some computing environments, this single unrestricted concept of system privilege is undesirable, and instead it is necessary to have a finer grained model security system. One approach to accomplishing this is to add an external security manager on top of the operating system, which applies additional rules for controlling access to system functions and resources.

External security managers can be created that augment standard UNIX security in the native operating system. These security managers support the definition of fine-grained rich security policy including more control over the privilege granted to the system administration program. Usually, the security manager maintains enhanced external user definitions. These user definitions contain extended information such as user group membership or roles. The security manager re-maps the local system user to its external user on resource accesses in order to make authorization decisions.

One problem with the implementation of a security manager is establishing a model in order to apply the security manager to a computing system and then prevent the normal OS administrative user from potentially disabling or administering the external manager without the required privilege. In addition, the security manager needs to be administered by a designated user, which has full administrative privilege to the external security manager, but limited capabilities with respect to the native operating system.

One of the functions of such a security administrator would be to restrict the actions and capabilities of the native system privileged user. A security manager might achieve this by intervening in accesses to system resources after it is made active on the system. It is likely that the native system administrative privilege is required to initially make the external security manager active. However, once the external security manager becomes active, it would be desirable to prohibit the native administrative user from being able to disable the external security manager. In addition, the external manager should not necessarily gain access to compromise the existing security of the native system.

There remains a need for a technique that would allow a native system administrator a broad privilege when activating an external security manager; transferring the privilege with respect to the activated security manager to a security administrator; and from the native system administrator such that the native system administrator has no privilege to the security manager.

SUMMARY OF THE INVENTION

An objective of this invention is to develop a privilege transfer method such that a native program, which has a computing system privilege appropriate to start the resource manager, does the start up of a resource manager.

Another objective of the present invention is to develop a privilege transfer method such that there is a subsequent transfer of the resource manager administrative privilege from the native privileged program identity to an identity designated to administer the resource manager.

Another objective of the present invention is to develop a privilege transfer method such that the administrative control of a resource manager by a designated identity has limited privilege with respect to the native computing system resources.

Another objective of the present invention is to develop a privilege transfer method such that after the privilege transfer, the initial native administrative program no longer has administrative control over the resource manager and may not alter or subvert it.

Another objective of the present invention is to develop a privilege transfer method such that descendent processes of the resource manager administrator program inherit the administrative privilege to the resource manager.

Another objective of the present invention is to develop a privilege transfer method such that when the registering agent and all its descendants (child processes) terminate on the computing system, the administrative privilege on the resource manager returns to the native systems administrative program.

Another objective of the present invention is to develop a privilege transfer method such that the present invention restricts the actions and capabilities of the native system administrative program.

The technique described in the present invention accomplishes this objective. This technique allows the use of a native privileged program identity for starting a security manager. For purposes of the description of this invention, the resource manager is a security manager. Once the security manager is started, the native privileged program identity loses authority over the security manager. This loss of authority allows the security manager the ability to subsequently restrict the native program identity's power over the security manager including the ability to stop or disable the security manager. Once started, an alternate identity acquires the privilege and the ability to further administrate the security manager. The alternate identify does not have any special privilege with respect to the native operating system.

The technique of the invention involves the use of a privilege registration interface in the external security manager, which allows an identity to register for privilege. The initial program registration requires the native system privilege, which is inherited from system start-up procedures or via a manual startup process by a system administrator. During the registration, a new administrative identity is provided. This administrative identity would be expected to be trusted and validated by some external mechanism, such as a Certified Authority or perhaps an authentication system such as Kerberos. The new program identity would not be required or expected to have any local native system privilege. Upon successful registration, only the new program identity has privilege to control and manage the external security manager. This control would include actions such as updating security manger policy, controlling options, or shutting down the security manager. The native system privileged program used in the start-up of the security manager would have no further privilege against the security manager. In addition to establishing the new identity as privileged, the calling process also becomes privileged. All spawned/descendent child processes of that calling process then inherit the privilege of the calling process. The effect is to transfer privilege from that native program identity to a new program identity and the ensuing hierarchy of related processes. The new privilege model stays in effect until all the privileged processes terminate. At that point, the new privileged identity resets and privilege returns back to the native system model. The typical application of this model might proceed as follows: 1) during system initialization, the external security manager is started and initialized. As part of this initialization, a deamon process starts running as the local native privileged identity. If the target system were UNIX, that native identity privilege would be 'Root'. The daemon would then register itself with the security manager and transfer privilege to the external security manager's administrative identity. In addition, the calling daemon program becomes privileged, as do all its descendent processes. Only when the external security manager is shutdown by the security administrator does the system return to its initial state. While the example and technique provided in this description is for a security manager, the technique could be applied to any software application where a privilege control model is desired, which transfers privilege from one entity to another with subsequent restrictions on the initiator.

DETAILED DESCRIPTION OF THE INVENTION

Figure 1:
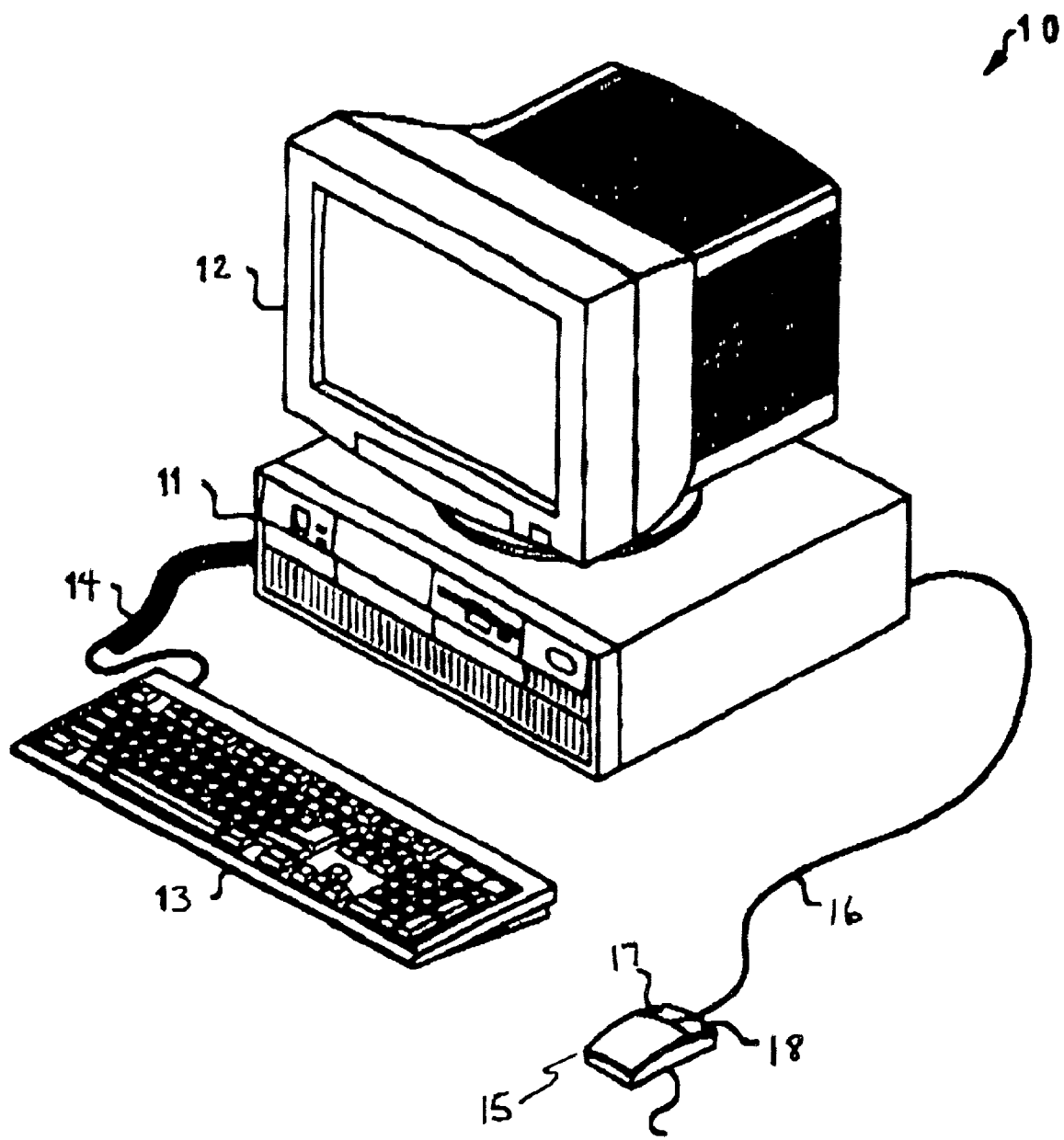
FIG. 1 depicts data processing equipment that can be utilized to implement the present invention.

FIG. 1 depicts a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Figure 2:
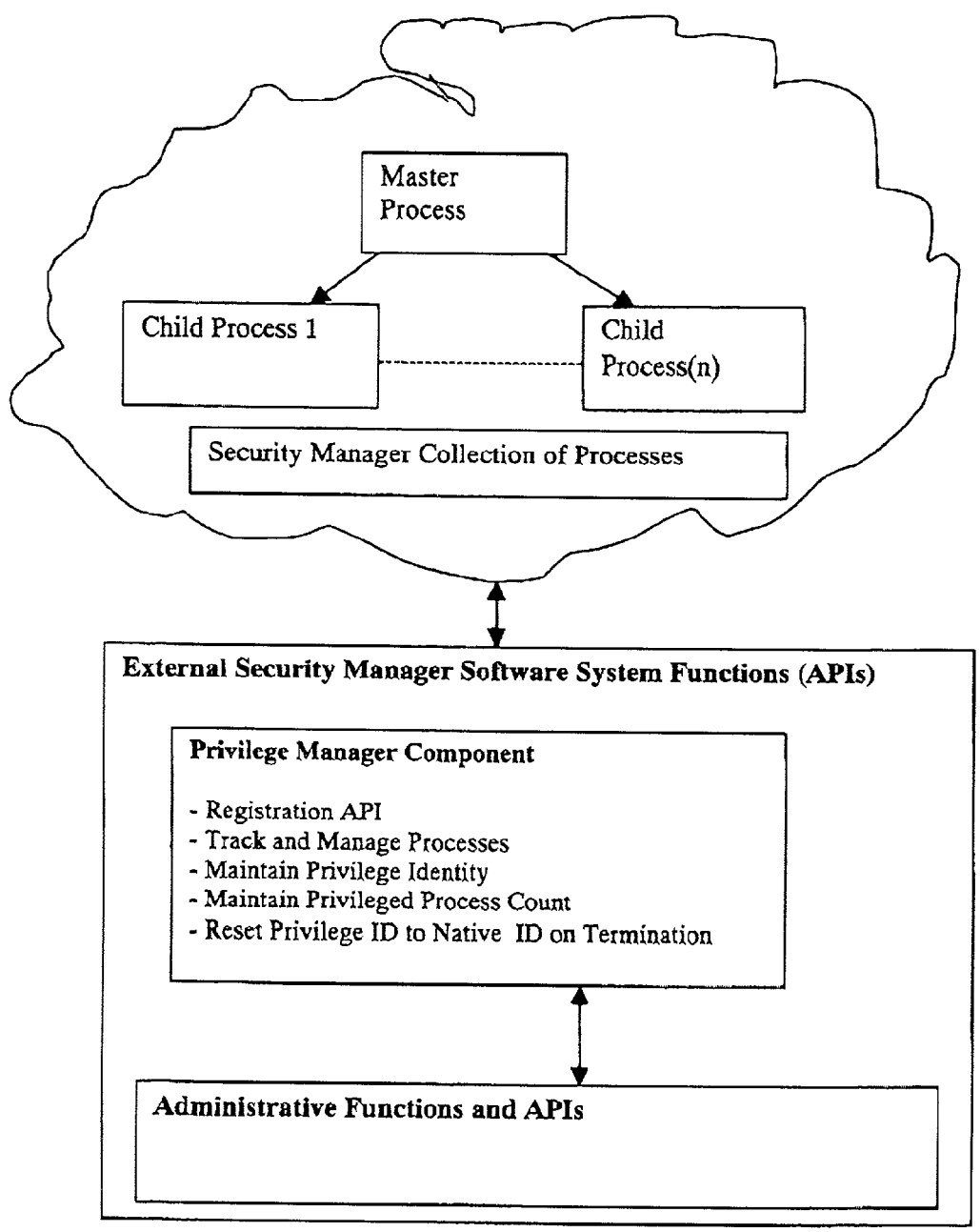
FIG. 2 is an example of the architectural relationship between a resource manager such as external security manager and the described privilege transfer method of the present invention.

FIG. 2 gives an example of the architectural relationship between components, such as the external security manager, the administrative processes and the privilege transfer method of the present invention. As shown, the security manager interacts with the administrative functions and the master processes.

The privilege transfer method of the present invention is described in the context of an operating system security manager. This security manager adds an external layer of security on top of the native operating system security. To execute this manager, it is necessary to start the manager on a computing system. Because of the nature of the security manager, start-up of the manager on a system requires a broad local computing system privilege. The security manager needs this broad privilege in order to access highly restricted system resources during initial operation of the security product. However, after the initialization of the security product, the security product no longer needs this broad privilege in order to operate. If the security manager maintained this broad privilege after the initialization, this security manager could be administered or subverted by any other identity on the system that might have a broad privilege. Therefore, after the initialization of the security manager, there is a need to transfer this privilege to another identity that is designated as the administrator of the security manager. This prevents the administration of that security manager by the native privileged identity that was used to start the security manager. For example without this prevention, the native privileged identity could alter security policy to grant itself greater privilege or bypass restrictive policy. The native identity could also shutdown the manager, which could allow it to bypass restrictive policy and access resources that it should not have access to. The transfer of privilege and associated loss of privilege for the native administrator prevents these types of attacks.

The embodiment of this invention is described in the context of the UNIX operating system. In the UNIX operating, the native administrative program identity is called 'root". This program identity has an unrestricted system privilege and is the one used to initially start the security manager on the system. Root is the only identity that has the necessary privilege to start a resource manager such as the security manager. Once the security manager begins to run on the system, the desire is to have the manager controlled by a designated user identity that was chosen to administer that security manager. In addition, it is desirable to for the Root identity to lose its privilege with respect to the security manager. It is undesirable to have the security system controlled by the root identity. If Root were able to control the security manager, this control by Root could compromise the security that the manager provides. The expectation is that the security manager will also apply policy to reduce the unrestricted privilege of the root identity. The intent of the present invention is to start the security manager with root and then transfer the administrative privilege of the manager to an identity that was designed to administer the security manager. The owner of the system can choose this designed security administrator identity. This identity has been created and validated through an external trusted mechanism and approved to administer the security manager. The security administrator identity has privilege for the security manager but does not have the same local native computer privileges as the UNIX root identity. The security administrator will have sole privilege to control the security manger, but will not be able to access other resources on the computing system. The technique of the present invention also enables the security administrator to endow this privilege to descendent programs created by that administrator such that these spawned programs also have this same privilege. When the security manager terminates, the original privilege that was initially transferred to the security administrator reverts back to the local native root identity restoring its ability to start the security manager. Therefore, the next time the security manager starts, the Root identity will be used to start the security manager and the process of privilege transfer repeats.

Figure 3:
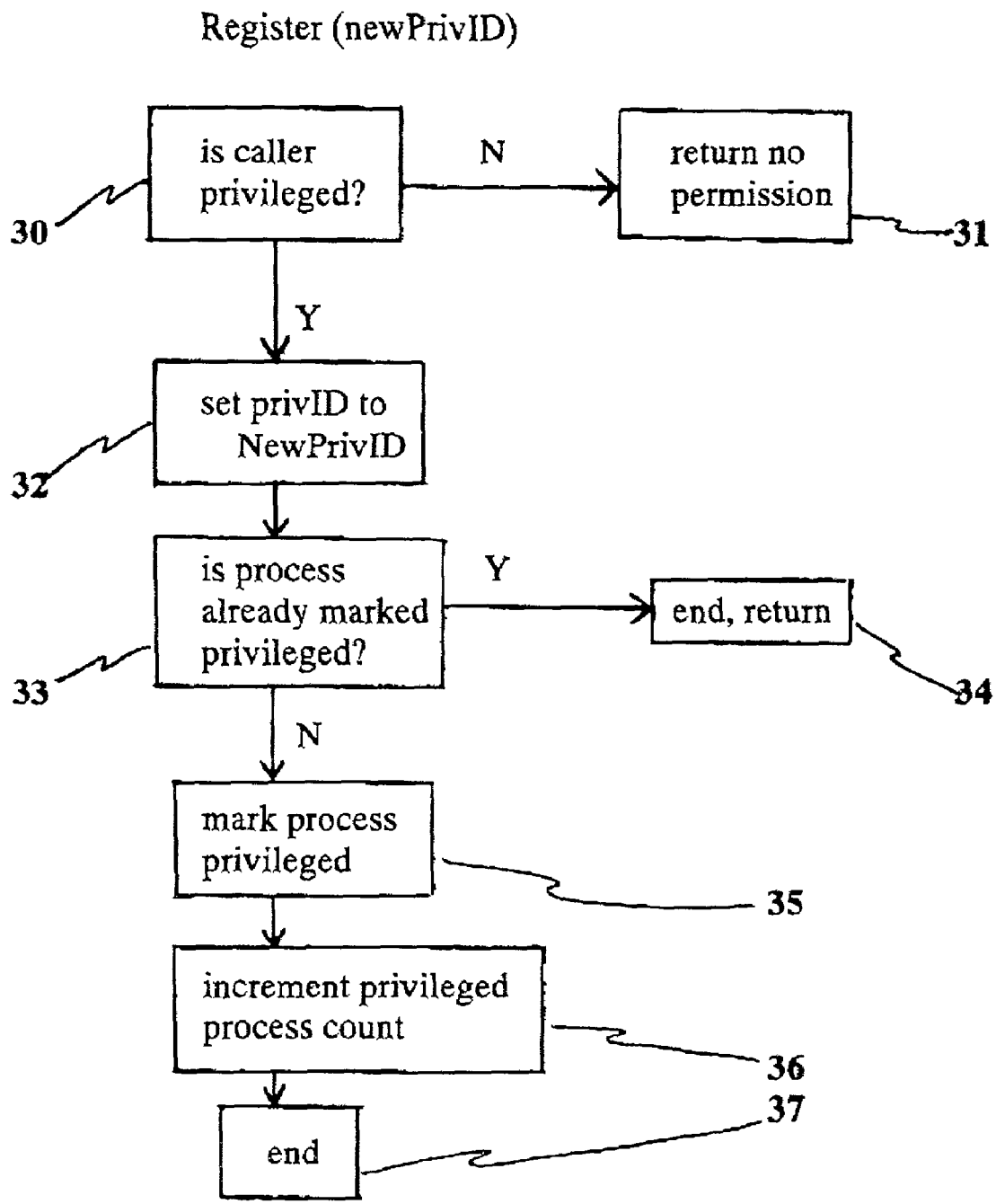
FIG. 3 is a logic flow diagram of the privilege registration process for a calling application program.

Referring to FIG. 3, this process includes the actual steps for the registration process in which the privilege transfer occurs. In order for a program to register for a privilege, the program has to request from the resource manager a privilege transfer. Registration is the act of transferring the privilege from the Root identity to the requesting program and the specified identity, which would be the security administrator for the purpose of managing that security manager in future, operations. In this process, the first check that occurs in Block 30 is whether the requesting program trying register is privileged. If no, in Block 31, then the returned response would be no permission. In the first registration, there is an assumption that the requesting program is the native administrative user identity. In that case, the answer to whether the requesting program is privileged would be "yes" even though this program has not yet registered. Therefore, if the requesting program were privileged, the caller would either be the native root, which would indicate that this is first caller or there has already been a registration and the requesting program is already running under the transferred identity. The technique proceeds to Block 32, which is to set the privilege identity to the new privileged identity that the requesting program has provided. In this method, the requesting program provides the new privileged identity when the requesting program invokes the registration process of FIG. 3. The new privileged identity provided by the requesting program has already been designated as being privileged and will be set as the new current privileged identity. This next step, Block 33, determines whether the process state has already been marked as privileged in a previous registration or if it is a descendent of a process that was already privileged. If the result of this check is yes, then the process is finished and the registration is complete as indicated in Block 34. If the result of Block 35 is no, that indicates that this process has not yet been marked as privileged but is being allowed to successfully register because it was already considered privileged from its identity because it was root or because it was calling as the current privileged identity. This step marks the process as privileged because it is not already marked as privileged. This process marks a state bit indicating that the process is privileged. The marking of the privilege state can depend on the particular implementation of this method. In this next Block 36, the process increments number of privileged processes being maintained is incremented. This number is the privileged process count. The process count incrementation completes the process 37. The caller is now successfully registered.

Figure 4:
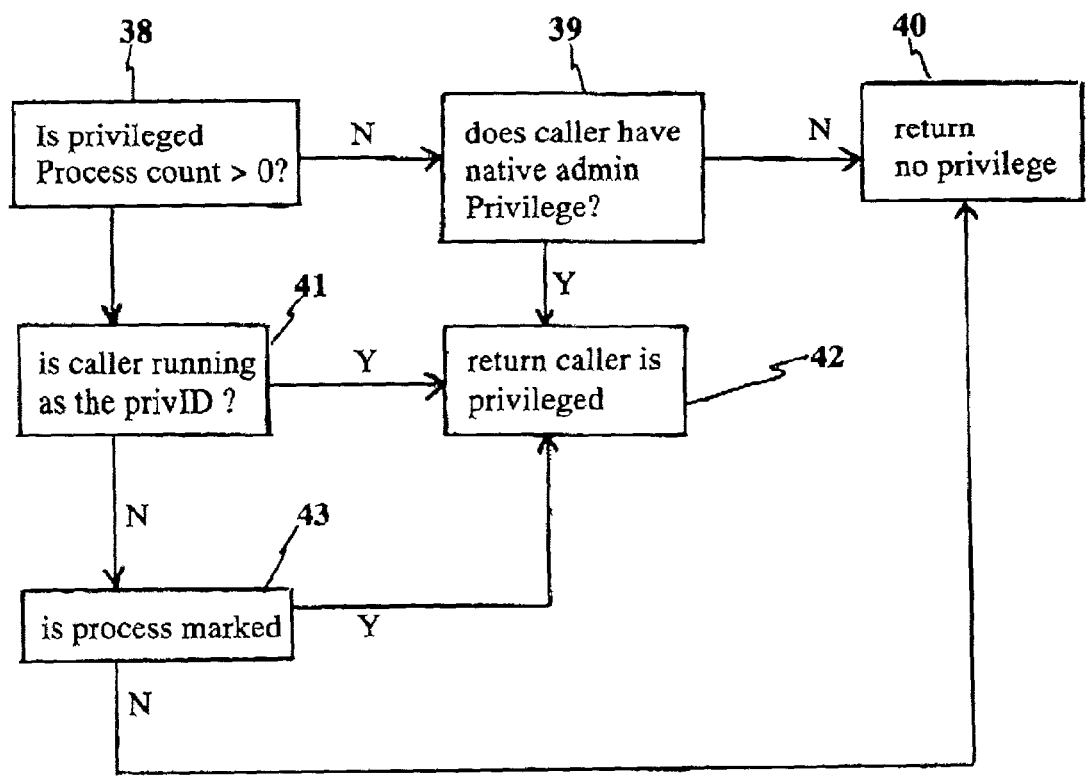
FIG. 4 is a logic flow diagram of the process that determines whether an application calling the security manager has a privilege to that security manager.

Once the Referring to FIG. 4, this algorithm determines if a registering process or caller currently has privilege with respect to the resource manager under which it is trying to perform some task. The actual task could be the act or registering or some administrative operation. Typically, any administrative operation that requires privilege to this resource manager will go through the logic flow of FIG. 4. Block 38 checks to determine if the privilege process count is greater than zero. This step is inquiring into whether registration has already occurred. If registration has occurred, the program would be running and may already have spawned descendent programs. Therefore, there would already be some number of processes in this process count. If no program had previously registered the process count would be zero. If the privilege process count is not greater than zero, the no case sends the process to Block 39, where the question then becomes does the caller have native administrative privilege? The method wants to know if the caller is the native administrative identity on the computing system. In the UNIX system, the question becomes is the caller the root identity. The no answer indicates that a registration has not yet occurred. At this point, the identity that has administrative privilege for the resource manager is the native administrative identity. If the answer is no to this question, the result is that the caller does not have privilege and no privilege is returned 40, Referring to Block 38, if the privilege process count is greater than zero, (there are already registered processes), the next question is whether to caller is running as the privileged identity 41. The privileged identity is the new identity that has been designated to administer the security manager. This identity is the identity that results from a successful registration. If the caller is running as the designated identity, the result of Block 42 is that the caller is privileged. If the caller is not running as the privileged identity, a check is made to determine if the calling process has already been marked as privileged as indicated in Block 43. This check is necessary because once a program successfully registers for privilege, it becomes privileged with respect to the security manager. If that program subsequently changes its running identity to some other identity, the program still retains its privilege with respect to the resource manager because it initially successfully registered for privilege. Once a program gets the privilege, as long as the program continues to run, that program retains the privilege even if its running user identity changes. If the result of the check in Block 43 is no, then the calling process is not privileged and the method will return a result of not privileged 40. If the answer to the question is the process marked as privileged is yes, the caller is privilege and the process returns to Block 42. The caller is now successfully registered. Once the caller successfully registers, for subsequent operations performed on the security manager, those operations that have been designated in a particular implementation of the method as requiring privilege, would use this privilege check process of FIG. 4 to determine whether the invoker of the operation is allowed to perform that operation.

Figure 5:
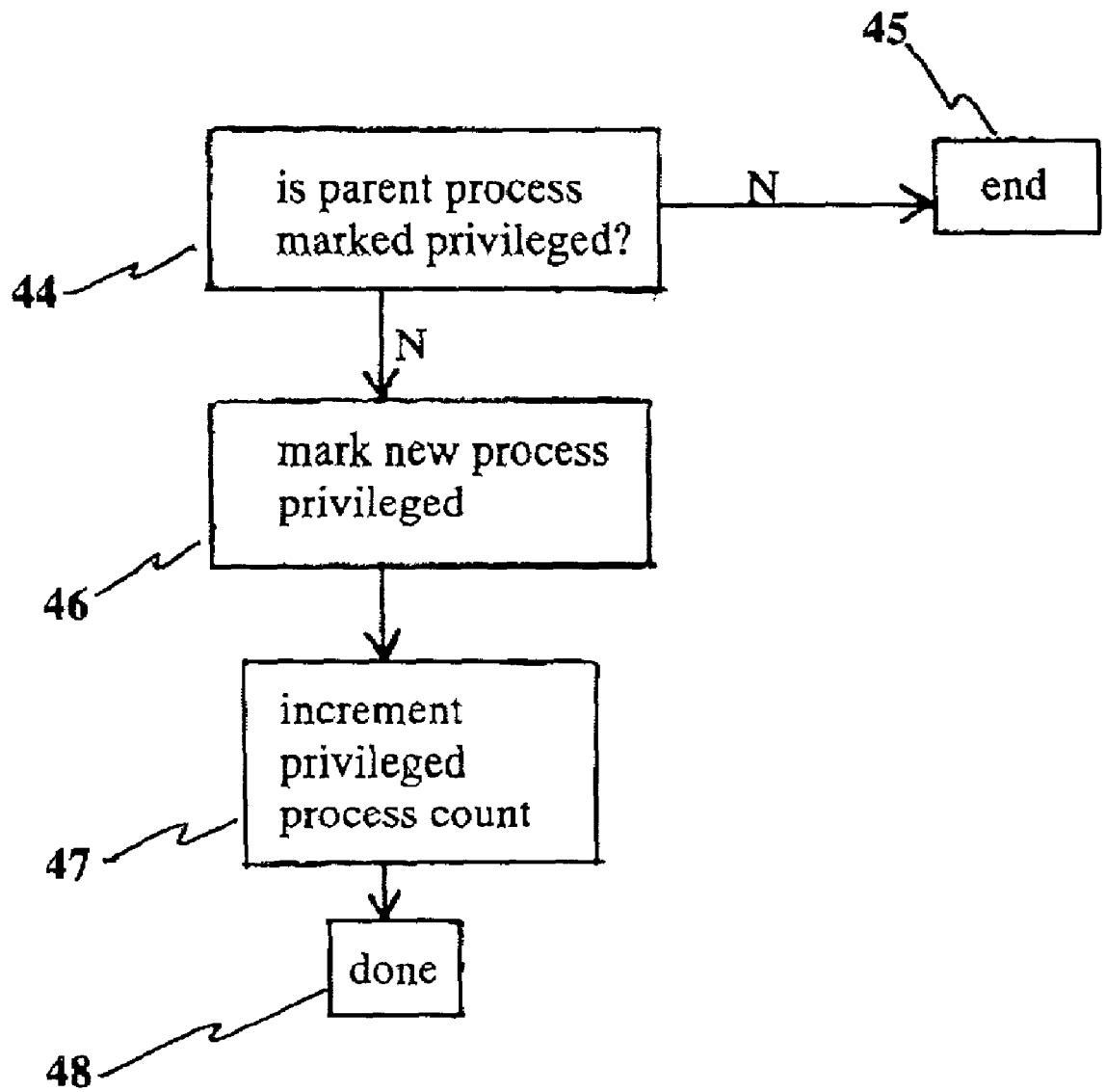
FIG. 5 is a logic flow diagram that tracks the number of descendent processes that are privileged to the security manager.

Once a program has obtained a privilege, that program may create new/descendent programs that will run on the system. As part of this method the descendent process will inherit the privilege of the parent process. When a new process is created, through any mechanism used to create descendent processes in the specific computing system, the method of the present invention applies to that program as described in FIG. 5. For example, a typical startup sequence of the described security manager on a UNIX system would involve the start master daemon process. The master would register itself and then spawn a series of new associated child processes using the fork( ) API. The collection of processes would comprise a functional instance of the running security manager with each process having an associated role. Example roles might include an auditing process, or a policy data update process. All the processes would need privilege to access functional APIs within the security manager's core. In this method, Block 44 determines if the parent process that spawns the new is privileged. If the answer is no, then the technique, in Block 45, ends. If the answer is yes, then the desire is for the child to inherit the privilege of the parent. The next step is to bestow the privilege to the new process. To accomplish this task it is necessary to mark the spawned process as a privileged process shown in Block 46. Since this process will be a new privileged process, there is a need to increment the privileged process count in Block 47. Once the process count increment occurs, the privilege inheritance to the descendent process has occurred. The process is now complete 48.

Figure 6:
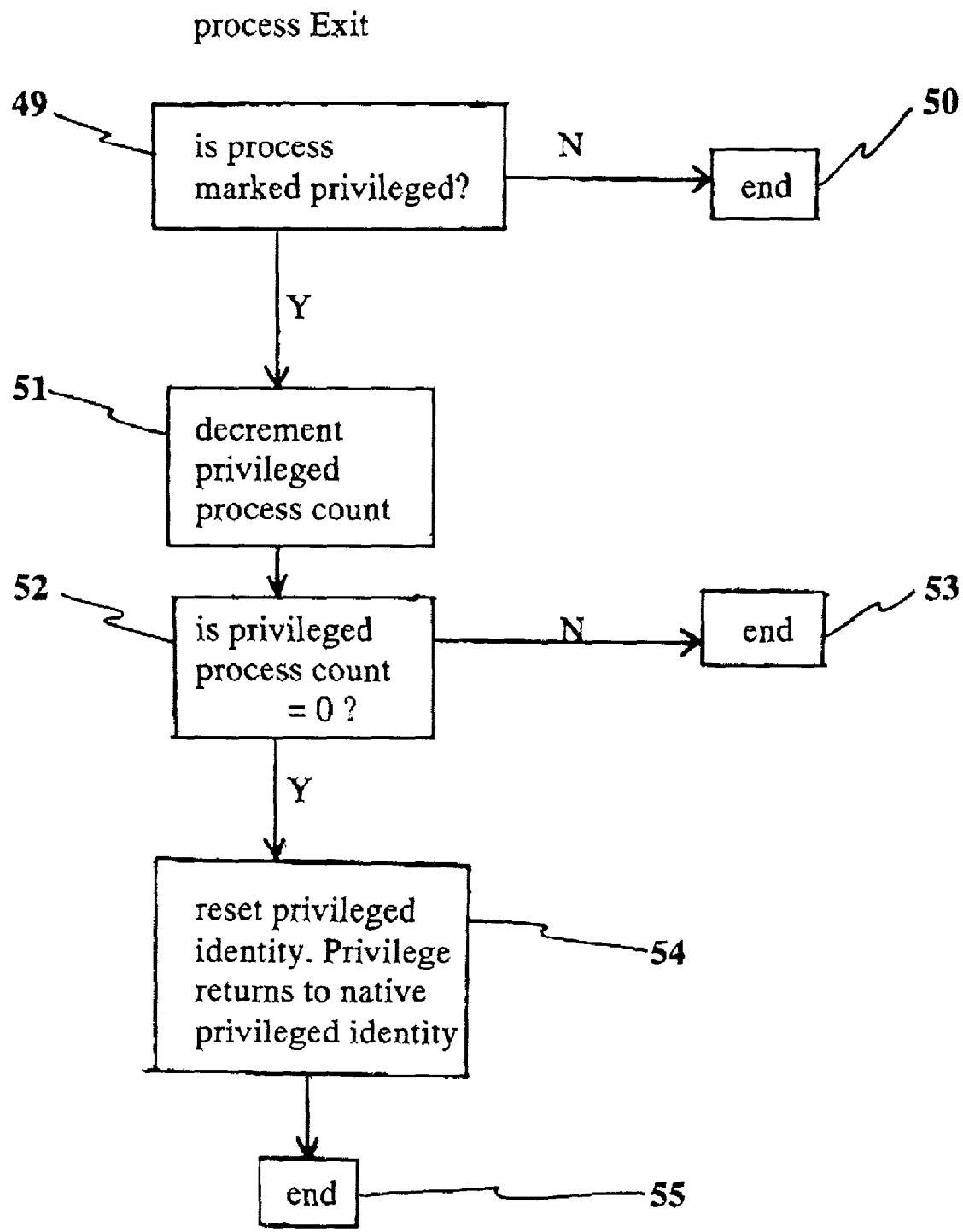
FIG. 6 is a logic flow diagram of the process of returning the privilege possessed by a security manager back to the initial privileged user identity at the termination of the security manager.

When a privilege process terminates or exists, there needs to be a determination of whether the terminating process is the last privilege process to terminate. At the termination of the last privileged process, the privilege returns to the native identity. FIG. 6 describes the steps in the application of this invention to that situation. When a process begins to terminate, Block 49 determines if this process is a privileged process. If the answer is no, the algorithm ends, Block 50. If the answer is yes, then this is a process that is terminating and will cease to exist on the system. Therefore, there is a decrement of the privileged process count 51. If after the privilege process count has been decremented, and the resulting count of privilege processes is not equal to zero 52 then the technique ends, Block 53. If the process count is zero, at this point there are no more processes running on the system that have this privilege to the resource manager. Therefore the privilege identity which has privilege with the resource manager needs to be reset the privilege identity to zero. The native program identity would regain the privilege 54. Once there are no more processes running that administers the security manager, the security manager is in effect no longer running. The security provided by that security manager no longer it effect. Therefore it is acceptable to transfer that privilege back to the native administrative identity. At this point, the method of FIG. 6 would then end in Block 55. If at a later time, a program desires to run the security manager, the process described in this will begin with FIG. 3.

In an example of the processes of the present invention, a customer would buy a product that is a resource manager, in this case an external security manager, that has the techniques of the present invention embodied in it. The external security manager is installed on the system from some installation media. The installer activates the security manager on the system. The security manager starts running as the native administrative identity. As part of that security manager starting and running, the security manager uses the technique of the present invention, which is contained in the security manager to transfer control of subsequent administration of the security manager to a new designated identity and related set of registered processes. When the registration and privilege transfer occurs, the initial administrative identity that started that security manager loses its ability to control that security manager while it is running. As long as the security manager is running, there will a set of processes that are running. Each of these processes will have this privilege with the security manager for the purpose of administering and controlling the security manager. As long as the processes are running, the native administrative identity cannot affect the security manager. At a later time, the administrator of the operating system and the security administrator will need to perform some activity such as maintenance on the computing system in order to install another product on the system. The installation of the new product requires the shutting down of the security manager. The security administrator shuts down the security manager. The result of the security manager shut down is that those privileged processes would now terminate. When the last of these processes terminates, the result is that the privilege of the security manager reverts back to the native system administrator identity. The system administrator then installs the new product on the system. The product on the system gets successfully installed. At this point, the system security will be restarted. The system administrator, which has the appropriate privilege because it is now the native program identity, can now start the security manager. Once the system administrator starts the security manager, the system administrator now loses that privilege with regard to the security manager. The security administrator now has that privilege.

While the specific implementation of the present invention relates to an external security manager for OS security, it could be applied generally to any software subsystem, which controls a set of resources (a resource manager).

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

Having thus described the invention, what we claim as new and desire to secure by Letters Patent is set forth in the following claims.

The invention claimed is:

1. A method for transferring and monitoring privilege access to a resource manager in a computing system comprising:

transferring a privilege to a native administrative system program that will administer the resource manager, said transferred privilege enabling the new system program to access the resource manager during initialization of the resource manager;

transferring the privilege to access the resource manager away from the native administrative system program that had the privilege during the initialization of the resource manager on the computer system and to a system program which does not have system administrative privileges, said privilege transfer away from the native administrative system program disabling the native administrative system program that had the privilege during the initialization of the resource manager and preventing the native administrative program from disabling the resource manager; and monitoring the number of programs that have privilege to the resource manager.

2. The method as described in claim 1 wherein the transferring of the privilege to the new system program comprises: registering the new system program; setting a privilege identity for the new system program; and incrementing a privilege process count.

3. The method as described in claim 2 wherein privilege registration comprises: requesting a privilege transfer to the resource manager by the new system program; and determining whether the new system program requesting the privilege transfer currently has a privilege to the resource manager.

4. The method as described in claim 3 wherein the step of determining whether the new system program making a request has privilege to the resource manager further comprises determining whether the new system program has a previous registration.

5. The method as described in claim 3 wherein the step of determining whether the new system program making a request has privilege to the resource manager further comprises determining whether the new system program is a descendent program of the new system program.

6. The method as described in claim 2 further comprising providing a new privilege identity by the new registered system program.

7. The method as described in claim 6 further comprising:
setting the privilege identity of the resource manager to the privilege identity of the new system program making the request;
determining whether the requesting program is marked as privilege; and
marking the requesting program as privilege when the program has not been previously marked as privileged.

8. The method as described in claim 1 wherein said monitoring step further comprises;
determining whether a privilege process count is greater than zero;
determining whether a requesting program is privileged;
marking the requesting program as privileged; and
returning privilege to the requesting program.

9. A method for transferring a privilege access, requested by a new system program, to a resource manager and monitoring privilege access to a resource manager in a computing system comprising:

determining whether the requesting program is eligible for a privilege to the resource manager;
setting a privilege identity to the resource manager to the privilege identity supplied by the requesting program;
marking the requesting program as privileged;
incrementing a privileged count process; and
transferring the privilege to access the resource manager away from the system program that had the privilege during initialization of the resource manager on the computer system, and transferring the privilege to a system program which does not have system administrative privileges.

10. A computer program product in a computer readable medium for use in transferring and monitoring privilege access to a resource manager in a computing system comprising;
instructions for determining whether the requesting program is eligible for a privilege to the resource manager;
instructions for setting a privilege identity to the resource manager to the privilege identity supplied by the requesting program;
instructions for marking the requesting program as privileged;
instructions for incrementing a privileged count process; and
instructions for transferring the privilege to access the resource manager away from the system program that had the privilege during initialization of the resource manager on the computer system, and transferring the privilege to a system program which does not have system administrative privileges.

11. The method as described in claim 1 wherein said step of transferring a privilege to a new system program that will administer the resource manager further comprises initializing a program having a system privilege, the initialized program being the native administrative system program.

* * * * *